United States Patent [19]

Lacaze et al.

[11] Patent Number: 5,522,981
[45] Date of Patent: Jun. 4, 1996

[54] PROCESS AND BATH FOR THE ELECTROLYTIC DEPOSITION OF POLYPYRROLE ON AN OXIDIZABLE METAL SURFACE BY ELECTRO-POLYMERIZATION

[75] Inventors: Pierre C. Lacaze, Paris; Jacques Petitjean, Verdun; Salah Aeiyach; Hedayatullah Mir, both of Paris, all of France

[73] Assignee: Sollac, Puteaux, France

[21] Appl. No.: 360,039

[22] Filed: Dec. 20, 1994

[30] Foreign Application Priority Data

Dec. 21, 1993 [FR] France .................................... 93 15385

[51] Int. Cl.⁶ .............................. C25D 11/00; C25D 9/00; C25B 3/02; C04B 9/02
[52] U.S. Cl. ........................ 205/317; 205/323; 205/419; 106/14.16; 106/14.13; 106/14.18; 106/14.37; 106/14.42; 106/14.43
[58] Field of Search ..................................... 205/316, 317, 205/323; 204/59 R, 72, 78; 106/14.11, 14.13, 14.16, 14.18, 14.37, 14.41, 14.42, 14.43

[56] References Cited

U.S. PATENT DOCUMENTS

| 4,401,545 | 8/1983 | Naarmann et al. | 204/78 |
| 4,547,270 | 10/1985 | Naarmann | 204/317 |

FOREIGN PATENT DOCUMENTS

| 2679240 | 1/1993 | France . |
| 62-189714 | 8/1987 | Japan . |
| WO90/10095 | 9/1990 | WIPO . |

OTHER PUBLICATIONS

Chemical Patents Index, Basic Abstracts Journal, Week 8739, Nov. 25, 1987, DerwentPublications, Ltd., AN 87–273477.

English Abstract of Japanese Patent 02 299 213, Dec. 11, 1990.

*Primary Examiner*—John Niebling
*Assistant Examiner*—Edna Wong
*Attorney, Agent, or Firm*—Oblon, Spivak, McClelland, Maier & Neustadt

[57] ABSTRACT

The invention relates to a process for depositing a thin adhesive coating of polypyrrole on the surface of an article made of oxidizable metal, by electropolymerization of an aqueous or aqueous-alcoholic electrolytic solution of pyrrole and/or of one or more substituted pyrroles, in which the anode of the electropolymerization device consists of the article made of oxidizable metal, in which the solution contains ions selected from the ions of formula:

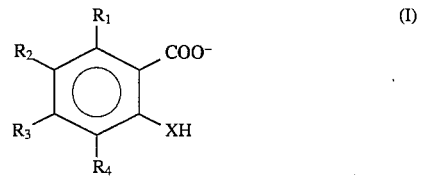

in which

X is selected from O, S and NH, $R_1$, $R_2$, $R_3$ and $R_4$ are selected, independently of each other, from —H, —Cl, —Br, —F, —I, —OH, —SH, —NH$_2$, —CHO, —COOH, —SO$_3$H and derivatives thereof, aryl groups, C$_1$ to C$_{20}$ alkyl groups, aralkyl groups and alkylaryl groups, these groups possibly being substituted with one or more groups selected from —OH, —SH, —NH$_2$, —CHO, —COOH, =O, —CONH$_2$, —N(X,X',X")$^+$, epoxy or C$_1$–C$_6$ alkoxy, or together possibly forming a ring structure.

15 Claims, No Drawings

PROCESS AND BATH FOR THE ELECTROLYTIC DEPOSITION OF POLYPYRROLE ON AN OXIDIZABLE METAL SURFACE BY ELECTRO-POLYMERIZATION

The present invention relates to a process for depositing an adhesive polypyrrole coating on the surface of an article made of oxidizable metal, based especially on iron, zinc, copper, nickel, aluminium or on alloys thereof, by electropolymerization of an aqueous or aqueous-alcoholic electrolytic solution of pyrrole and/or of one or more substituted pyrroles, in which the anode of the electropolymerization device consists of the said article made of oxidizable metal.

The present invention aims to provide a conductive adhesive coating intended for the primary protection of metal articles against corrosion, for reinforcing the bonding of layers of paint or glue to the surface of these metal articles and also for the production of sheet metal sandwiches and sheet steels for packaging. The present invention also aims to facilitate the assembly operations for such coated articles, in particular by electric welding, since the coating is electrically conductive.

In the present Application, the term "polypyrrole" is used conventionally to denote a pyrrole polymer, a polymer of a pyrrole derivative or a copolymer comprising pyrrole.

Also, the term "electropolymerization of pyrrole or of substituted pyrroles" is used to denote an oxidation by electrolysis of a monomer dissolved in an electrolytic solution, followed by an anodic polymerization of the monomer which is oxidized with the anions of the dissolved electrolyte; the polymer thus obtained is also oxidized and doped with the anions of the electrolyte and is thus electrically conductive; the surface of the anode thus coated with this polymer therefore remains conductive, which enables the oxidation at the anode-electrolyte interface to continue and enables layers to be deposited with controllable thickness.

It is known to deposit, according to a process of the abovementioned type, an adhesive and homogeneous coating of polypyrrole on an article made of a metal of low oxidizability, either made of a noble metal such as, for example, gold and platinum, or made of stainless steel.

Such depositions are not possible on articles made of a more oxidizable metal, for example iron, steel, zinc, copper, nickel or aluminium, because the said metal article which serves as the anode dissolves in the aqueous or aqueous-alcoholic electrolytic solution; this phenomenon of anodic dissolution generally increases when the temperature of the solution rises.

Such depositions have, however, been made on an iron- or aluminium-based substrate by using an aqueous electrolysis bath containing nitrates or oxalates, according to Beck and Michaelis, Journal of Coating Technology; vol. 64, No. 808, pp. 59–67 (1992); in the case of the oxalates, the deposits obtained can be particularly adhesive and homogeneous.

According to this document, the adhesion and the homogeneity of the deposit obtained depend on the conditions under which the deposition is carried out.

In particular, this adhesion increases with the temperature of the electropolymerization solution; however, since the increase in temperature also results in an increase in the dissolution of the substrate at the expense of the pyrrole electropolymerization reaction, the adhesion remains limited.

In particular also, this adhesion increases when the pyrrole or oxalate concentrations decrease; however, it is known that decreasing these concentrations results in a decrease in the electrical efficiency for the deposition operation; the desire to increase the adhesion then entails the risk of culminating in electrical deposition conditions which are incompatible with an industrial application.

Moreover, such baths do not allow for high electrolysis intensities, that is to say high rates of deposition, while at the same time retaining the adhesion and homogeneity properties of the deposit.

In addition, under deposition conditions which are most favourable to adhesion, in particular under acidic conditions, it may be necessary to carry out a pretreatment of passivation of the metal article to be coated, for example by deposition of manganese oxide, in order to avoid a phase of dissolution of the substrate at the start of the polarization of the anode.

Finally, such deposits have the drawback of being poor conductors, which may be an inconvenience when it is desired to assemble by electric welding metal articles coated with such deposits, or when it is desired to carry out other depositions, in particular electrolytic depositions, on articles of this same type.

The aim of the invention is thus to enable an adhesive, homogeneous and conductive deposit of polypyrrole to be made on an article made of oxidizable metal, based not only on iron, but also especially on zinc, copper, nickel, aluminium or on alloys thereof, to avoid a pretreatment of said article, to enhance greatly the rate of deposition, including that in continuous processes of electrolytic deposition, especially when the metal article is a metal sheet with a high throughput speed.

To this end, the present invention provides a process for the deposition of a homogeneous and very adhesive coating of polypyrrole to the surface of an article made of oxidizable metal, based especially on iron, zinc, copper, nickel or aluminium and alloys thereof, by electropolymerization of an aqueous or aqueous-alcoholic electrolysis bath containing pyrrole and/or one or more substituted pyrroles in solution, in which the anode of the electropolymerization device consists of the said article made of oxidizable metal, in which the said solution contains ions selected from the ions of formula:

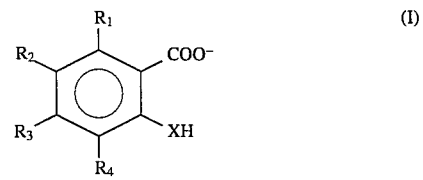

(I)

in which:

X is selected from O, S and NH, $R_1$, $R_2$, $R_3$ and $R_4$ are selected, independently of each other, from —H, —Cl, —Br, —F, —I, —OH, —SH, —NH$_2$, —CHO, —COOH, —SO$_3$H and derivatives thereof, aryl groups, $C_1$ to $C_{20}$ alkyl groups, aralkyl groups and alkylaryl groups, these groups possibly being substituted with one or more groups selected from —OH, —SH, —NH$_2$, —CHO, —COOH, =O, —CONH$_2$, —N(X,X',X")$^+$, —SO$_3$H, epoxy or $C_1$–$C_6$ alkoxy, or together possibly forming a ring structure.

The use of ions of formula I, such as salicylate ions, in the aqueous electrolysis bath makes it possible, surprisingly, both to slow down considerably the oxidation of the metal at the surface of the article made of oxidizable metal, and to impart to the said surface electrocatalytic properties similar to that of a platinum surface with respect to the pyrrole electropolymerization reaction.

The ions of formula I may be associated in solution with metal cations (especially alkali metal cations) or ammonium $N^+(R)_4$ cations (where R is an alkyl or aralkyl group) which are soluble in the electrolysis bath.

The ions of formula I may advantageously be selected such that they enhance the contact between the electrolysis bath and the metal article to be coated and/or enhance the solubility of the pyrrole monomers and/or of one or more substituted pyrrole monomers. This selection advantageously enables the range of pyrrole polymers or of pyrrole-derived polymers deposited by the process according to the invention to be broadened, depending on the properties required for the coating.

The polymerizable pyrrole compounds used as starting materials are, obviously, pyrrole compounds which are not substituted in the alpha position.

The pyrrole compounds may especially be selected from the compounds of formula II:

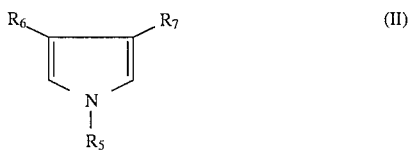

in which $R_6$ and $R_7$ are selected, independently of each other, from —H, —Cl, —Br, —F, —I, —OH, —SH, —$NH_2$, —CHO, —COOH and derivatives thereof, or in which $R_6$ and $R_7$ correspond respectively to the formula $X_6$—$R'_6$ or $X_7$—$R'_7$, where $X_6$ and $X_7$ are selected, independently of each other, from O, S, and NH, and/or in which $R_5$, $R_6$ or $R'_6$ and $R_7$ or $R'_7$ independently represent a hydrogen atom, an aryl group, an alkyl group or an aralkyl group, these groups possibly being substituted with one or more groups selected from —OH, —SH, —$NH_2$, —CHO, —COOH, =O, —$CONH_2$, $N(X,X',X'')^+$, —$SO_3H$, epoxy or $C_1$–$C_6$ alkoxy and derivatives thereof, the groups $R_6$ or $R'_6$, on the one hand, and $R_7$ or $R'_7$, on the other hand, together possibly forming a ring structure, or from the lower oligomers of a monomer of formula II, containing up to four units derived from the said monomer, or from compounds combining several units of formula II, which may be different from each other, in which at least one of the C—C bonds of each pyrrole ring of each unit of formula II is also one of the C—C bonds of another pyrrole ring of another unit of formula II, for example such as represented below:

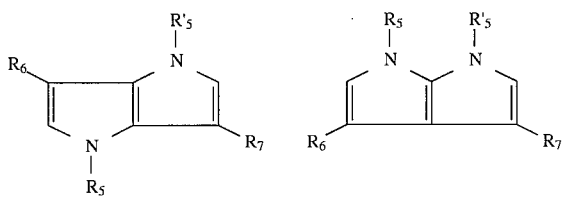

The pyrrole derivatives used as starting materials are known or may be prepared according to the known methods; see, for example, Patents and Patent Applications U.S. Pat. Nos. 4,567,250, 4,697,000, EP-257,573, EP-229,992 and EP-315,559. The lower oligomers of pyrrole and of pyrrole derivatives may be obtained, for example, according to the methods described by Kauffman and Lexy, Chem. Ber. 114, 3674–3683 (1981) and by Lindenberger et al., Synthetic Metals, 18, 37–41 (1987).

By selecting suitably substituted pyrrole starting materials, it is possible to decrease the porosity of the deposit by crosslinking the polypyrrole chains, to facilitate the subsequent bonding of glue or of paint, or to enhance the protective qualities of the coating obtained. The substituents may be selected, for example, on the basis of their contribution towards the impermeability to gases of the polymer layer formed; see, for example, van Krevelen, Properties of Polymers, Correlations with Chemical Structure, Elsevier Publishers Company (1972), chapter 18. It is also obvious to specialists that by suitably selecting one or more substituents on the starting material, it will be possible to obtain a polymer layer containing reactive groups which are capable of promoting, by chemical reaction (formation of covalent bonds), the bonding of a layer of paint or of a glue which is subsequently applied.

The starting materials derived from pyrrole containing substituents with polar groups (for example —OH, including —COOH) enable the adhesion properties of the polymer formed on the metallic substrate to be reinforced. It is known that virtually all glues for metals contain such polar groups. The starting materials containing reactive substituent groups (—OH, —$CO_2H$, —$NH_2$, ethylenic double bond or terminal epoxy group) may serve for the subsequent crosslinking of the polymer layer, or for the subsequent bonding of another layer (glue or paint for example), according to methods which are known per se: for example, reaction of the —OH groups with diisocyanates, reaction of the epoxy groups with diamines, formation of amide bonds, reaction of two —CH=$CH_2$ double bonds to form a crosslinking bridge of the —$CH_2$—CH=CH—$CH_2$— type, and the like. Finally, by selecting substituents for the starting materials containing substituent groups which promote the impermeability to gases and in particular to oxygen (see the van Krevelen article cited above), it is possible to obtain polymer layers whose properties of protection against corrosion by oxidation of the metallic substrate are reinforced.

As indicated above, the substituted or unsaturated alkyl or aryl groups and the unsaturated alkyl groups may, in particular, facilitate the subsequent bonding of paint or of glue, or may make crosslinking possible.

The electropolymerization bath may especially contain, in addition to a polymerizable pyrrole compound, pyrrole compounds which are suitably substituted in the alpha position, which will block the chain extension of the polymers, but which will be capable of inter-reacting to form crosslinking bonds. For example, the bath may contain at least one compound of formula III:

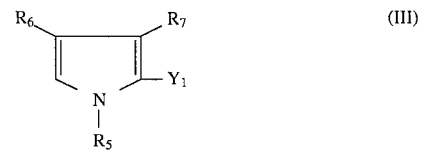

and at least one compound of formula IV:

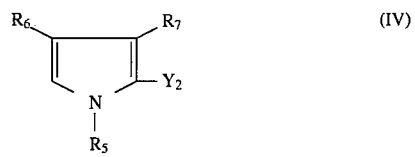

in which $Y_1$ and $Y_2$ are functional groups capable of inter-reacting to form a covalent bond between a unit derived from a monomer of formula III and a unit derived from a monomer of formula IV. The substituent $Y_1$ may, for example, represent $-(Z)_n-CO_2H$ and $Y_2$ may represent $-(Z')_n-NH_2$, Z and Z' independently representing an alkylene group, and m and n independently representing numbers equal to zero or 1. If required, it is thus additionally possible to carry out a treatment which enables the coating to be crosslinked, for example by reaction of the groups $Y_1$ and $Y_2$, as indicated above. It is possible, in particular, to carry out the crosslinking treatment by heating to a temperature which is sufficient to form amide bonds by reaction of the carboxylic and amine groups. The process may especially be performed at a temperature of the order of 150° to 180° C., in the absence of catalyst, or at a lower temperature in the presence of a catalyst.

It is possible to enhance the electropolymerization electrical efficiency for the actual electropolymerization operation by increasing the concentration of the ions of formula I and/or of the compounds of formula II in solution in the electrolysis bath. Moreover, the presence of the ions of formula I makes it possible to increase the concentration of the compounds of formula II.

The concentration of the ions of formula I in solution is advantageously greater than 0.1 mol/liter and preferably greater than or equal to 0.5 mol/liter.

The concentration of the compounds of formula II in solution is advantageously greater than 0.1 mol/liter and preferably greater than 0.4 mol/liter.

The upper limits of the concentration of the compounds of formulae I and II correspond to the limits of solubility of the two compounds.

In general, the higher the concentrations of the compounds of formulae I and II, the better the deposition conditions.

As a guide, for an aqueous solution containing both pyrrole and sodium salicylate, the limits of solubility are approximately:

|  | Room temperature | 50° C. |
| --- | --- | --- |
| pyrrole | 2.5 mol/l | 4 mol/l |
| sodium salicylate | 4 mol/l | 4 mol/l |

The pH of the electrolysis bath is between 3 and 10 and preferably between 4 and 6.

On account of the reduction of water at the cathode, the pH of the solution increases during the electropolymerization; it may thus be necessary to compensate for this increase by addition of acid, for example such as salicylic acid, in order to maintain the pH at the desired value. It is also important to maintain the concentrations of pyrrole monomer and of electrolyte, in particular here the ions of formula I, in the solution in the electrolysis bath at the desired values, in order to avoid any disruption to the deposition of the coating.

The adhesion of the deposit may advantageously be increased by raising the temperature of the bath, while at the same time retaining the benefit of a considerable slowing down of the oxidation of the metal at the surface of the article made of oxidizable metal; nevertheless, in order to limit the evaporation of the pyrrole, an excessive increase in the bath temperature will be avoided.

The process is generally performed at an aqueous or aqueous-alcoholic electrolysis bath temperature between 10° C. and 60° C.

With an aqueous or aqueous-alcoholic electrolytic solution as described above, it is possible to perform the deposition by electropolymerization under the following electrical conditions:

the electropolymerization current density may be adjusted on the basis of the desired rate of deposition, to values greater than or equal to 0.4 $A/dm^2$ and preferably greater than 10 $A/dm^2$.

The electropolymerization reaction is stopped when the layer deposited reaches the desired thickness, generally between 0.2 and 40 micrometers approximately. The thickness of the coating depends on the duration of electropolymerization. Since the coating is conductive and its surface does not become passive, it is thus possible to produce thick coatings.

The above deposition conditions are particularly advantageous in terms:

of absence of passivation pretreatment of the article to be coated;

of high deposition rate, which may reach 1 micrometer in less than 5 seconds instead of at least 1 minute if the solution contains no ions of formula I;

of electropolymerization electrical efficiency;

of absence of toxicity risks, due to the use of an aqueous or aqueous-alcoholic solvent and the absence of pretreatment of the article to be coated.

The process according to the invention in particular enables depositions to be made on articles moving in the electrolytic solution at a speed of greater than 10 m/minute and thus enables continuous depositions to be made on these travelling metal sheets.

The coating obtained exhibits very good adhesion to the surface of the metal article, great homogeneity and a good aptitude for electrophoresis, which results from maintenance of this good adhesion of the coating even under cathodic polarization.

The polypyrrole coating thus obtained is in the doped state and is conductive; the conductivity of the coating film reaches values comparable to that of a film deposited on platinum in an aqueous or aqueous-alcoholic electrolysis bath.

A metal article thus coated, or a sheet metal sandwich comprising a metal sheet thus coated which is covered with a second metal sheet, may be readily assembled by electric welding using conventional means and according to a standard preparation of metal sheets without removal of the coating at the weld site; a metal article thus coated may also be subjected to other subsequent deposition treatments, especially electrolytic deposition treatments.

In order to render the coating less conductive, if such is the need for other uses, it is possible to perform either an anodic overoxidation or a cathodic dedoping according to the known methods.

The process according to the invention may be used for producing primary coatings, especially for protection against corrosion of the surface of oxidizable metal articles or for bonding layers made of polymer material, for example of glue or of paint, to the surface of articles of this same type.

Obviously, the article to be coated may be made of any material which has been precoated with an oxidizable metal, such as zinc, copper, nickel, aluminium or on alloys thereof.

The examples which follow illustrate the process according to the invention without, however, limiting it. In these examples, the tests were performed in covered baths to avoid or limit the evaporation of the pyrrole or of the derivatives thereof.

EXAMPLE 1

An aqueous electrolysis bath is prepared, consisting of 6.4 g of sodium salicylate and 1.35 g of pyrrole in 40 cm$^3$ of distilled water; salicylic acid is added to bring the pH of the solution to about 6.

A pre-degreased zinc, iron or copper metal plate is immersed in the solution.

Polyrpyrrole is then deposited by electropolymerization onto this plate, which serves as the anode, by passing a current of about 0.5 A/dm$^2$ between the electrodes for about 20 seconds. Throughout the deposition, the potential difference reading between the anode and a saturated calomel reference electrode gives an approximately constant value of 0.8 V.

The film thus obtained adheres very strongly to the metal plate: an adhesion test carried out according to AFNOR Standard NFT 30038 gives an adhesion result of 100%, that is to say that the peeling rate of the film by adhesive paper is zero.

The film is then rinsed with distilled water and with ethanol, dried under vacuum and then stored under argon.

Analysis of the XPS, infrared and Raman spectra of this film indicates that this film possesses an identical structure to that of a standard polypyrrole film.

The conductivity of the film deposited is about 6 S/cm (measured by the four-point method).

When, under the same conditions, the time for which the current passes between the electrodes is 1 minute instead of 20 seconds, the thickness of the deposit obtained reaches 1 micrometer. The rate of deposition here is of the order of 0.016 micrometer per second.

EXAMPLE 2

The same aqueous electrolysis bath as in Example 1 is prepared.

A galvanized steel article, for example a galvanized, electrogalvanized or vacuum-galvanized steel article, which has been pre-degreased with acetone, is immersed in the solution.

The process is performed according to the same conditions as above, and in particular at the same rate of deposition, that is to say with the same current density.

The film obtained exhibits the same adhesion and structural qualities, irrespective of the type of galvanized steel.

EXAMPLE 3

The same aqueous electrolysis bath as in Example 1 is prepared.

A mild steel article, which has been pre-degreased with acetone, is immersed in the solution.

The process is performed according to the same conditions as above, and in particular at the same rate of deposition, that is to say with the same current density.

The film obtained exhibits the same adhesion and structural qualities as in Example 1.

EXAMPLE 4

The electrolysis bath consists of 3.9 grams of sodium 5-chlorosalicylate and 1.35 grams of pyrrole dissolved in 40 cm$^3$ of distilled water. The pH of the bath is adjusted to a value close to 5 by addition of 5-chlorosalicylic acid.

A pre-degreased zinc metal plate is immersed in the bath.

Polypyrrole is then deposited by electropolymerization onto this plate, which serves as the anode, by passing a current of about 0.4 A/dm$^3$ between the electrodes for 1 minute.

Throughout the deposition, the potential difference reading between the anode and a saturated calomel reference electrode gives an approximately constant value of 0.8 V.

The deposit obtained is very homogeneous.

EXAMPLE 5

The same aqueous electrolysis bath as in Example 1 is prepared.

A disc made of zinc or of galvanized steel is mounted on rotational drive means and is immersed in the electrolysis bath.

While the disc is rotated at a speed of about 4000 revolutions per minute, a polypyrrole film is then deposited by electropolymerization onto this disc, which serves as the anode, by passing a current of about 30 A/dm$^2$ between the electrodes for about 5 seconds.

Throughout the deposition, the potential difference reading between the anode and a saturated calomel reference electrode gives an approximately constant value of 3.5 V.

The deposit obtained is very homogeneous.

The film thus deposited adheres very strongly to the metal plate: an adhesion test carried out according to AFNOR Standard NFT 30038 gives an adhesion result of 100%, that is to say that the peeling rate of the film by adhesive paper is zero.

The thickness of the film deposited is about 5 micrometers.

The conductivity of the film deposited is about 4.8 S/cm (measured by the four-point method), which value is very much higher than that of films deposited in an oxalate medium according to the prior art.

EXAMPLE 6

An aqueous electrolysis bath is prepared, consisting of 12.8 g of sodium salicylate and 2.7 g of pyrrole in 40 cm$^3$ of distilled water. Salicylic acid is added to bring the pH to about 5.

A disc made of zinc or of galvanized steel is mounted on rotational drive means and is immersed in the electrolysis bath.

While the disc is rotated at a speed of about 4500 revolutions per minute, a polypyrrole film is then deposited by electropolymerization onto this disc, which serves as the anode, by passing a current of about 100 A/dm$^2$ between the electrodes for about 1 second.

During the deposition, the bath temperature is about 42° C.

The thickness of the film deposited is about 3 micrometers.

The conductivity of the film deposited is about 0.65 S/cm (measured by the four-point method).

EXAMPLE 7

The same electrolysis bath as in Example 1 is prepared, but "a" g of an N-substituted pyrrole derivative is also added, which derivative is chosen from the following three monomers:

i) 6-(2-pyrrolyl)-n-hexanol

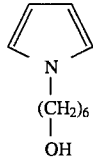

"a" = 0.33 g ii) 6-(1-pyrrolyl)-n-hexanoic acid

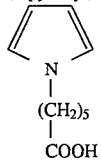

"a" = 0.36 g iii) 3-(1-pyrrolyl)-1,2-epoxypropane

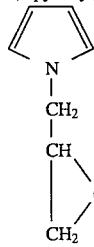

"a" = 0.25 g

These monomers were synthesized by any one of the following methods:

by the standard method, which consists in treating the pyrrole with a very strong base (K; Na) and in reacting the pyrrole anion thus formed with a suitable alkylating agent (G. Bidan, Tetrahedron Letters, 26, (1985), 735; G. Bidan and M. Guglielmi, Synthetic Metals, 15, (1986), 49);

by the solid-liquid phase transfer technique (W. C. Guida and D. J. Mathre, J. Org. Chem., 45, (1980) 3172).

The relative proportions of pyrrole and of the pyrrole derivative in the medium are then in the molar ratios 1/0.1.

The pH of the bath is adjusted to 5 by addition of salicylic acid as in Example 1.

A pre-degreased iron, steel, zinc or galvanized steel metal plate is immersed in the solution.

Polymer is then deposited by electropolymerization on this plate, as in Example 1, and, since the oxidation potentials of pyrrole and of the N-substituted derivative are very close, a potential difference of about 0.8 V is measured between the anode and a saturated calomel reference electrode during the deposition.

The polymer layer thus obtained is composed both of pyrrole radicals or chains and of N-substituted pyrrole radicals or chains.

By selecting the nature and the concentration of the N-substituted pyrrole, it is advantageously possible:

i) to reinforce the adhesion properties of the coating on the metal substrate;

ii) to enhance the protective properties of the layer deposited, especially after a crosslinking treatment (for exhale by heating);

iii) to promote the bonding of another layer (glue, paint).

Irrespective of the N-substituted pyrrole derivative added to the electrolysis bath, the films deposited are at least equivalent in adhesion and homogeneity to those of the homologues thereof described in Example 1 and which correspond to standard polypyrroles, containing no N-substituted pyrrole units in the chains.

EXAMPLE 8

The same electrolysis bath as in Example 1 is prepared, but 0.25 g of 2-(2-ethylamino)-N-methylpyrrole and 0.25 g of N-methyl-2-pyrrolecarboxylic acid, which are commercial products, are also added.

The relative proportions of pyrrole and of the pyrrole derivatives are in the ratios 1/0.1/0.1.

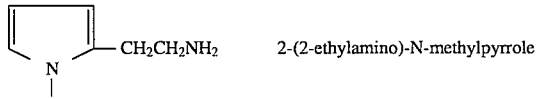

2-(2-ethylamino)-N-methylpyrrole

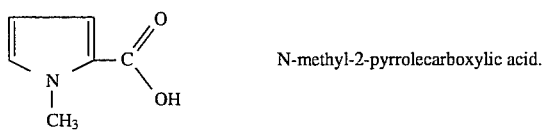

N-methyl-2-pyrrolecarboxylic acid.

The pH of the bath is adjusted to 5 by addition of salicylic acid.

A pre-degreased iron, steel, zinc or galvanized steel metal plate is immersed in the solution.

The process is then performed according to the same operating conditions as in Example 1, and a potential difference of about 0.8 V is also measured between the anode and a saturated calomel reference electrode.

Due to the fact that the oxidation potentials of the substituted pyrroles are very close to that of simple pyrrole (N+0.8 V/SCE), the two comonomers present in the electrolysis bath participate in the electropolymerization reaction and intervene by blocking the chain extension.

The polymer films deposited are of at least equivalent adhesion and homogeneity to those of the homologues thereof described in Example 1.

After drying, the films are heated in an oven at 180° C. for 10 minutes, which has the effect of bringing about a condensation between the —COOH and —NH$_2$ groups and therefore inter-chain crosslinking with formation of amide bonds between the carboxyl and amino derivatives.

EXAMPLE 9

An aqueous electrolysis bath is prepared, consisting of 70.4 kg of sodium salicyate and 7.4 l of pyrrole in 220 l of distilled water.

The pH of the bath is adjusted to 5 by addition of salicylic acid.

The electropolymerization is performed in a cell incorporating circulation of electrolyte. The metal plate to be coated is a steel plate with a useful surface area of 170 cm$^2$, which has been pre-coated with 10 μm of zinc. It is kept stationary, whereas the electrolyte circulates. It is connected to the (+) pole (anode) of a generator which allows high intensities (a few hundred amps per square decimeter) to be delivered. The other pole of the generator is connected to a zinc cathode. The distance separating the anode from the cathode is 10 mm.

Various modes of deposition are envisaged, by varying the flow rate of the fluid (R) between the anode and the cathode, the current density applied (J) and the electrolysis time (t) (Table 1).

TABLE 1

| Test No. | R (m/min) | $J_{applied}$ (A/dm$^2$) | t(s) | Thickness (μm) |
|---|---|---|---|---|
| 1 | 150 | 10 | 8 | 2 |
| 2 | 150 | 10 | 4 | 1 |
| 3 | 150 | 10 | 2 | 0.5 |
| 4 | 250 | 10 | 20 | 5 |
| 5 | 450 | 10 | 8 | 2 |
| 6 | 450 | 10 | 4 | 1 |
| 7 | 450 | 25 | 3 | 2 |

In tests 1 to 3, the deposition time is varied and the thickness of the deposit which results therefrom varies in the same proportions of 0.5μ to 2μ; all the layers thus deposited exhibit good adhesion to the substrate (100% according to standardized test, cf. Example 5) and good homogeneity.

In tests 5 and 6, the electropolymerization bath flow rate between the anode and the cathode is varied, relative to the above series of tests: the layer obtained has the same thickness, and still has good adhesion and good homogeneity.

Test 7 corresponds to a higher deposition current density, which does not damage the adhesion and homogeneity properties of the layer.

Test 4 is intermediate between the first and the second series of tests: the elevated bath flow rate prevents any risk of local precipitations which may occur due to an extended deposition time.

EXAMPLE 10

The same aqueous electrolysis bath as in Example 6 is prepared.

A disc made of zinc or of galvanized steel is mounted on rotational drive means and is immersed in the electrolysis bath.

While the disc is rotated at a speed of about 4500 rev/min, a polypyrrole film is deposited by electropolymerization on this disc, which serves as the anode, by passing a current of about 70 A/dm$^2$ between the electrodes for about 1 s. The thickness of the film deposited is about 1 μm.

A second aqueous electrolysis bath is then prepared, consisting of 0.32 g of N-methylpyrrole and 2.8 g of sodium sulphate ($Na_2SO_4$) in 40 ml of distilled water.

The polypyrrole-coated galvanized steel disc is mounted on the same drive means as above and is immersed in the new electrolysis bath.

While the disc is rotated at a speed of about 4500 rev/min, a film of poly(N-methylpyrrole) is deposited on the polypyrrole film by electropolymerization on this disc, which serves as the anode, by passing a current of 30 A/dm$^2$ for about 2 s.

The new deposit obtained is very homogeneous and, due to the hydrophobic nature of poly(N-methylpyrrole), it further enhances the resistance to corrosion of the substrate.

We claim:

1. Process for depositing an adhesive coating of polypyrrole on a surface of an article made of oxidizable metal, based on iron, zinc, copper, nickel or aluminum or alloys thereof, by electropolymerization of an aqueous or aqueous-alcoholic electrolytic solution of pyrrole, one or more substituted pyrroles, or pyrrole and one or more substituted pyrroles in an electropolymerization device comprising an anode, in which the anode of the electropolymerization device consists of said article made of oxidizable metal, and said solution containing ions selected from ions of formula:

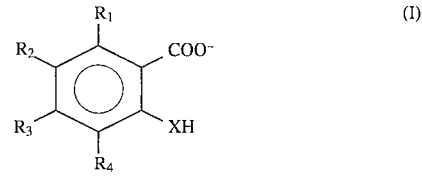

in which:

X is selected from O, S and NH, $R_1$, $R_2$, $R_3$ and $R_4$ are selected, independently of each other, from —H, —Cl, —Br, —F, —I, —OH, —SH, —NH$_2$, —CHO, —COOH, —SO$_3$H and derivatives thereof, aryl groups, $C_1$ to $C_{20}$ alkyl groups, aralkyl groups and alkylaryl groups, these groups possibly being substituted with one or more groups selected from —OH, —SH, —NH$_2$, —CHO, —COOH, =O, —CONH$_2$, —N(X,X$^1$,X$^{11}$)$^+$, —SO$_3$H, epoxy or $C_1$–$C_6$ alkoxy, or together possibly forming a ring structure.

2. Process according to claim 1, in which the solution contains ions of formula I in which X is oxygen.

3. Process according to claim 1, in which a concentration of the ions of formula I in solution is greater than or equal to 0.1 mol/liter.

4. Process according to claim 1, in which a concentration of ions of formula I is greater than or equal to 0.5 mol/liter.

5. Process according to claim 1, in which a electropolymerization current density is greater than or equal to 0.4 A/dm$^2$.

6. Process according to claim 1, in which a electropolymerization current density is greater than 10 A/dm$^2$.

7. Process according to claim 1, in which a total concentration of pyrrole and of one or more substituted pyrroles in solution is greater than 0.1 mol/liter.

8. Process according to claim 1, in which a total concentration of pyrrole and of one or more substituted pyrroles in solution is greater than 0.4 mol/liter.

9. Process according to claim 1, in which a pH of the said solution is between 3 and 10.

10. Process according to claim 1, in which the said anode is in movement in the electrolytic solution at a speed of greater than 10 m/minute.

11. Aqueous or aqueous-alcoholic electropolymerization bath for carrying out a process for depositing an adhesive coating of polypyrrole on an article made of oxidizable metal, based on iron, zinc, copper, nickel or aluminum or alloy thereof, by electropolymerization of an aqueous electrolytic solution of pyrrole, one or more substituted pyrroles, or pyrrole and one or more substituted pyrroles in an electropolymerization device comprising an anode, in which the anode of the electropolymerization device consists of said article made of oxidizable metal, said bath containing ions selected from ions of formula:

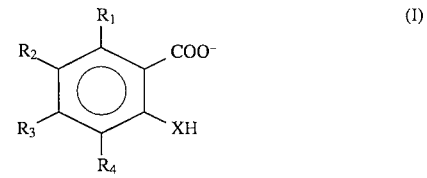

in which:

X is selected from O, S and NH, $R_1$, $R_2$, $R_3$ and $R_4$ are selected, independently of each other, from —H, —Cl, —Br, —F, —I, —OH, —SH, —$NH_2$, —CHO, —COOH, —$SO_3H$ and derivatives thereof, aryl groups, $C_1$ to $C_{20}$ alkyl groups, aralkyl groups and alkylaryl groups, these groups possibly being substituted with one or more groups selected from —OH, —SH, —$NH_2$, —CHO, —COOH, =O, —$CONH_2$, —$N(X,X^1, X^{11})$, —$SO_3H$, epoxy or $C_1$–$C_6$ alkoxy, or together possibly forming a ring structure.

12. Process for the protection against corrosion of articles made of oxidizable metal, based on iron, zinc, copper or aluminium or on alloys thereof, in which a polypyrrole coating is deposited on the surface of the said article according to claim 1.

13. The process according to claim 1, wherein said surface of said article consists of an oxidizable metal selected from the group consisting of iron, zinc, copper, nickel, aluminum and alloys thereof, and wherein $R_1$, $R_2$, $R_3$ and $R_4$ are selected, independently of each other, from H, Cl, Br, F, I, OH, SH, $NH_2$, CHO, COOH, $SO_3H$, aryl groups, $C_1$–$C_{20}$ alkyl groups, aralkyl groups and alkylaryl groups, said aryl groups, alkyl groups, aralkyl groups and alkylaryl groups optionally being substituted with one or more substituents selected from the group consisting of OH, SH, $NH_2$, CHO, COOH, =O, $CONH_2$, $SO_3H$, epoxy and $C_1$–$C_6$ alkoxy.

14. The process as claimed in claim 1, wherein said surface consists of zinc, copper, galvanized steel, mild steel, or iron.

15. The process as claimed in claim 13, wherein X is oxygen.

* * * * *